(No Model.) 2 Sheets—Sheet 1.
L. MOND.
MANUFACTURE OF CYANOGEN COMPOUNDS AND AMMONIA.
No. 269,309. Patented Dec. 19, 1882.
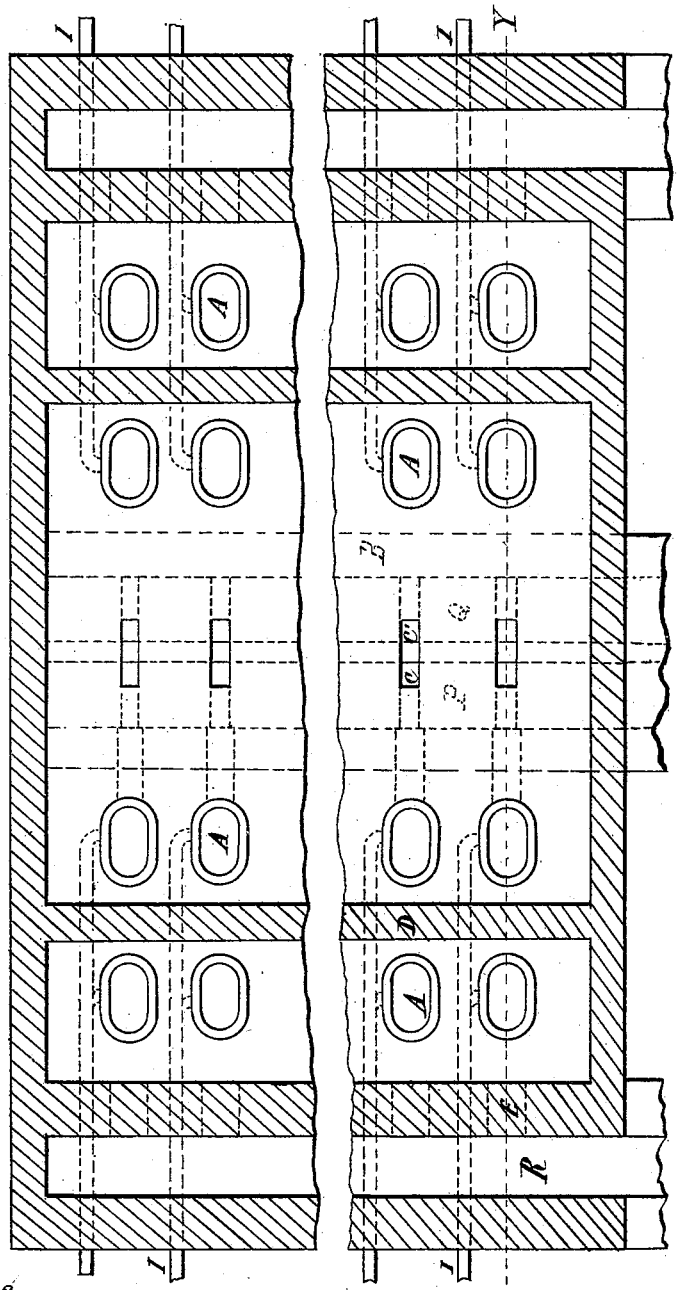

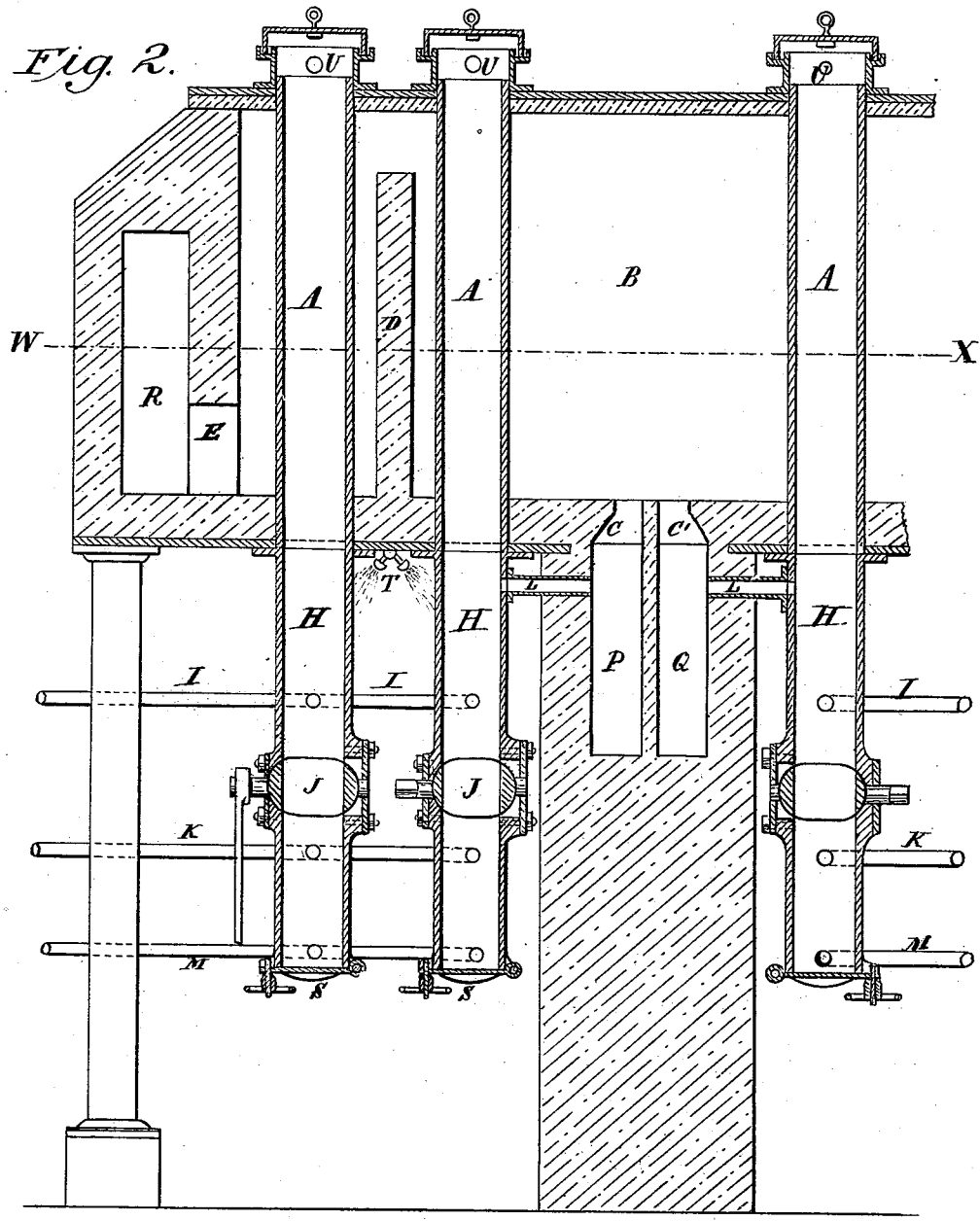

UNITED STATES PATENT OFFICE.

LUDWIG MOND, OF WINNINGTON HALL, NORTHWICH, COUNTY OF CHESTER, ENGLAND.

MANUFACTURE OF CYANOGEN COMPOUNDS AND AMMONIA.

SPECIFICATION forming part of Letters Patent No. 269,309, dated December 19, 1882.

Application filed January 28, 1882. (No model.) Patented in Belgium January 28, 1882, No. 56,919; in England January 28, 1882, No. 433; in France January 28, 1882, No. 147,105; in Austria-Hungary May 25, 1882, No. 20,196 and No. 4,798.

*To all whom it may concern:*

Be it known that I, LUDWIG MOND, of Winnington Hall, Northwich, in the county of Chester, England, manufacturing chemist, have invented a new and useful Improvement in the Manufacture of Cyanogen Compounds and Ammonia, of which the following is a specification.

This invention consists in improvements on the process of obtaining barium cyanide and ammonia patented by Messrs. Margueritte and Saurdeval in Great Britain, No. 1,027 of 1860, which consists in heating barium carbonate or barium oxide, intimately mixed with carbon in an atmosphere of nitrogen to an elevated temperature, whereby a compound or compounds of barium and cyanogen are formed, and then treating the material by steam at a temperature of from 300° to 500° centigrade, whereby ammonia is liberated. This process failed to succeed commercially, owing, among other reasons, to the materials being used in the pulverulent form, and being thus apt to cake or choke or cause the gas to act imperfectly, and also owing to the various operations being performed in one retort, which was consequently subjected to frequent and great changes of temperature, causing great waste of fuel and wear and tear. To obviate these defects I first make my materials into bricks or lumps, and when using retorts form the cyanogen compound in one retort or upper part of the retort only and cool it in a second retort or chamber connected with the first, or in the lower part of the retort, and either form the ammonia in the bottom of the cooling-space or in a separate apparatus altogether. In making the bricks or lumps I take the barium carbonate and carbon, preferably finely pulverized, and, if desired by the operator, mixed with a quantity of carbonate of strontia, magnesia, or lime, but preferably magnesia, so as to make them less fusible as a whole, and when mixed form them into blocks with pitch as an agglutinating substance, molding them hot, as is done with "patent fuel," and preferably heat these blocks in a reducing-flame to a degree sufficient to coke the pitch, or, still further, until a part or all of the barium carbonate is converted into barium oxide. If necessary, when cold, break these blocks up to the requisite size—say lumps of such size as will pass through a ring about three inches in diameter; or I mix the carbon and barium carbonate on the bed of a furnace in a reducing-flame till the carbonate melts and forms a pasty or viscous mass with the carbon, when it is withdrawn, cooled, and broken up.

The change to cyanogen compound can be accomplished in various ways. One plan is to pile the materials in chambers, kilns, or ovens of convenient shape, preferably kilns of the type known as a "continuous kiln," consisting of numerous chambers, some of which are being heated while the others are being cooled, filled, or emptied. A chamber being filled, it is heated by passing through it a gas which has been elevated to a high temperature—say 1,400° centigrade—before entering the chamber, said gas containing as much nitrogen as possible with the smallest practicable amount of oxygen, carbonic acid, or vapor of water. Fuel can be economized both in heating and in cooling on the well-known principle used in continuous kilns. When a sufficient amount of cyanogen compound has been formed the hot gas is shut off, and cool gas of the same or similar composition is passed through until the temperature is reduced to below 500° centigrade, when the supply of gas can be shut off and the materials treated with steam to liberate ammonia, which is drawn out by means of an aspirator and condensed or absorbed as desired; or the current of cold gas is continued until the material is sufficiently cool to take it out of the chamber, (in any case below 300° centigrade.) It is then heated with steam in a suitable apparatus—say an iron retort—at a temperature of from 300° to 500° centigrade. The ammonia given off in this operation can be collected in sulphuric acid or in any other well-known manner. After this treatment the bricks can be repeatedly subjected to the same treatment until the carbon is sufficiently exhausted, when they are ground up with fresh carbon and pitch and made into bricks again; or they may be remade after each operation by replacing the carbonaceous materials consumed.

As a source of nitrogen I prefer the gases escaping from the manufacture of sodium bicarbonate by the ammonia process. These gases may be heated to the required temperature by any known means, preferably a Siemens regenerator; or I use the products of combustion of coal or coke with a minimum quantity of air, so that they contain as little carbonic acid and vapor of water as possible. These gases may be obtained at the required temperature by passing them through a regenerator or other heating apparatus, or preferably by previous heating of the air used in the combustion of the fuel. In this latter case these gases, after leaving the last kiln used at the time for heating the material, are cooled by passing them under boilers, pans, &c., or through a scrubber down which water is running, before they are introduced into the kiln or kilns in which at the time the material is cooling. Having served for this latter purpose, the gases, which consist largely of carbonic acid, can be used as a source of heat—say for heating the air, raising the steam, and heating the ammonia-generating apparatus in the process under consideration—or for any other purpose.

In some cases it may be found convenient to use the hot gases obtained from gas-producers, as described, for heating the material used to effect the cooling, or by the gases obtained from the manufacture of bicarbonate of soda by the ammonia process, or by any other gases of the required composition which may be available. A modification of this plan (useful especially in small works) consists in forming the barium cyanide in a retort or chamber the upper part of which is heated externally, while the lower part is not exposed to the heat, but, on the contrary, is cooled preferably both externally and internally, as will be hereinafter described. The material is cooled in its passage through the lower part, and near the bottom is exposed to the action of steam; or the material is carried, when sufficiently cooled, to an independent apparatus to be steamed.

In place of steam, a spray of water, or mixture of steam and water or of nitrogen and water, may be introduced.

This system and apparatus can be best described by aid of the accompanying drawings, in which Figure 1 shows a sectional plan through W X of Fig. 2, and Fig. 2 a vertical section through Z Y of the plan.

A A are clay retorts set in four rows in heating-chamber B. c c are the entrance-holes for the gas and air, preferably brought from a Siemens regenerator; D D, diaphragms or partitions of fire-clay placed between each pair of rows of retorts to force the products of combustion to ascend round one row and descend round the other to the exit-holes E; E, exit-holes carrying the products of combustion back to regenerator. H H are the lower portion of the retort A, preferably made of iron, which can be surrounded by water or cooled by a blast of air or spray from roses T T, placed in any convenient position as found most convenient. I is the pipe through which cold gases rich in nitrogen are passed into the cooling part of the retort or chamber; J, a stop-cock, and K entrance for steam. These are not necessary parts of the apparatus, and are only used when the steaming is performed in the lower part of the chamber instead of in a separate apparatus, such as I prefer to use.

K represents the entrance for steam when used; L, junction or entrance for gases, sometimes used in an alternative mode of working, as explained farther on; M, escape for ammonia. P Q are the flues supplying gas and air, respectively, from the regenerator; R, the exit-tubes carrying the waste gases back to the regenerator; S, doors of retorts.

The mode of action is as follows: The retorts or chambers A and H being nearly filled with blocks which have already undergone the cyanide-forming process, the upper ends of retorts A are filled with fresh briquettes or lumps of barium carbonate or oxide and carbon. The heat in the heating-chamber B is maintained to from 1,100° to 1,400° centigrade, and gases rich in nitrogen are passed through entrances I I into the chambers H H. As the briquettes get hot the nitrogen reacts upon them, and a compound of barium and cyanogen is formed. From time to time material is abstracted from the bottom of chamber H and fresh material inserted at the top of A. Usually the material abstracted (which should have been reduced below 300° centigrade, as at a higher temperature it would be almost instantly decomposed by contact with air) is taken to other apparatus, heated in a retort to 400° or 500° centigrade, and then treated with common or superheated steam or with steam and spray, as may be found best in practice in each works, the temperature of the cyanide being raised and maintained higher when steam and spray are used than when superheated steam is employed. If, however, (though I do not prefer it,) it is desired to do the steaming in the lower part of the chamber H, I so arrange the temperature of the nitrogen and the external cooling agents that the materials in the chamber H, when they descend past the stop-cock J, shall be at a temperature of about 400° to 500° centigrade. I then pass in steam through orifice K. This steam must be of less pressure than the nitrogen entering at I, or the stop-cock J must be closed when the steam is on, as it is very undesirable that the steam should rise up among the hot material. The steam is passed downward through the materials, and the ammonia formed leaves by orifice M. Then the steam is shut off, the stop-cock is closed, and that portion of the materials hitherto exposed to the action of the steam is withdrawn. The stop-cock is then opened and the material allowed to descend to fill the void, a fresh charge is inserted at the top of A, and the operation goes on as before.

In some cases, instead of cold nitrogen being introduced at I, it may be found desirable to introduce a hot mixture of nitrogen and carbonic oxide as free as possible from oxygen, vapor of water, or carbonic acid through pipe L.

With regard to the foregoing, I would remark that when cold nitrogen is introduced at I it rises up among the hot material, cooling the latter and being heated in its turn till, as it enters A, it is very hot, thus economizing fuel on the principle of the continuous kiln recommended for working on a large scale. In the alternative plan of introducing a hot mixture of nitrogen with carbonic oxide at L less heat need be transmitted through the walls of the retorts, and the yield of the apparatus will be much increased. This will, however, necessitate more cooling space or appliances. The gases given off at the top of A and N are also richer in carbonic oxide when the hot gases, as above described, are introduced into the retort, and they can be more profitably used for heating purposes.

It is important that the carbonaceous matter should be as free as possible from silica. I prefer therefore to use coke obtained from pitch or oil. It is also advantageous to mix some sawdust with the materials forming the brick to make the latter more porous.

The most favorable proportions for the materials forming the bricks are one hundred and sixty-three of barium carbonate, forty-three carbon, and fifty-eight pitch. The addition of carbonate of strontium, calcium, or magnesium is not necessary; but some can be added in quantities to suit the operator. Less care need then be exercised to prevent the fusing of the barium carbonate by too great heat.

Throughout this specification I have only spoken of barium. The invention is, however, also applicable with little modification if potassium or sodium be used instead of barium, and possibly at extremely high temperatures some of the other alkaline earths might be substituted for barium. In practice, however, I have found barium so much superior to even the metals of the alkalies that I did not consider it worth while doing more than merely mentioning the alkaline metals as in this case a barely practicable and very poor chemical substitute for barium, and one which I would not advise the adoption of except under extraordinary circumstances.

I am aware that partitions have been employed between vertical retorts in gas-retort ovens to cause the products of combustion from the furnace to travel up to the top and down to the bottom of the oven in a circuitous path, and this I do not claim; but I believe my particular arrangement of the air and gas flues, together with the oven and diaphragm, constitutes a structure new as a whole.

Having thus described my invention, what I do claim is—

1. In the process of manufacture of cyanogen compounds or of ammonia therefrom, forming into blocks an intimate mixture of carbon, carbonate or oxide of barium, and of a refractory basic absorbing material—such as magnesia—and preliminarily calcining the same out of contact of air before exposing them in the heated state to nitrogen for the formation of the cyanogen compounds.

2. In the manufacture of cyanogen compounds of barium or of ammonia therefrom, the preliminary heating of the mixture of barium carbonate or oxide and carbon in a reducing-flame until they form a pasty mass, and the breaking up of the mass after cooling into lumps for the formation of cyanogen compounds by contact with nitrogen at an elevated temperature.

3. The combination of the gas and air flues P and Q, the retorts A, the diaphragm D, and the exit-holes E at the bottom of the chamber, by which means the gases have to circulate up among one range of retorts and down among the next set before escaping.

4. The combination, with the iron cooling-chamber H, connected with the clay retort A, of a device, T, for sprinkling the said chamber H with fine spray, for the purposes described.

5. A retort provided with a cooling-chamber, A, the entrance for nitrogen I, the steam-entrance K, and the stop-cock J, placed between.

6. The combination of the pipe I, supplying nitrogen at a pressure above the atmosphere, stop-cock J, not entirely closing the passage, chamber H, and door S, for the purposes described.

7. The improvement in the manufacture of cyanogen compounds by means of barium salts or oxide and carbon, which consists in first heating the nitrogenous gases before entering the converting-chamber by passing them through the hot barium salts, said salts being thereby cooled, and immediately passing these gases through fresh layers of barium salts and carbon at the temperature required to form cyanogen compounds.

8. In apparatus for manufacturing ammonia, the combination of a cyanogen-forming retort or chamber, A, a cooling-chamber, H, below that, and an ammonia-forming chamber below the cooling-chamber, separated from the cooling-chamber by a valve or cock and from the outer air by a lid.

9. The improvement in the manufacture of ammonia by means of barium salts and carbon, which consists in using the same nitrogenous gases successively for forming the cyanogen compounds, for heating the barium salts and carbon to the desired temperature, and for cooling the cyanogen compounds after they are formed.

10. The improvement in the manufacture of cyanogen compounds by means of barium salts or oxide and carbon, which consists in cooling the hot cyanogen compounds by passing through them nitrogenous gases as free as possible from oxygen, carbon dioxide, and vapor of water, whereby these gases become heated.

LUDWIG MOND.

Witnesses:
WM. P. THOMPSON,
WM. MAKEPEACE EDWARDS.